No. 690,908. Patented Jan. 7, 1902.
J. LUDWIG.
VEHICLE WHEEL TIRE.
(Application filed Feb. 18, 1898.)
(No Model.)

Witnesses
Inventor
Johann Ludwig
Attorneys

UNITED STATES PATENT OFFICE.

JOHANN LUDWIG, OF MAYENCE, GERMANY, ASSIGNOR OF ONE-HALF TO FERDINAND SICHEL, OF MAYENCE, GERMANY.

VEHICLE-WHEEL TIRE.

SPECIFICATION forming part of Letters Patent No. 690,908, dated January 7, 1902.

Application filed February 18, 1898. Serial No. 670,837. (No model.)

*To all whom it may concern:*

Be it known that I, JOHANN LUDWIG, a subject of the Emperor of Germany, and a resident of Mayence, Germany, have invented certain new and useful Improvements in Vehicle-Wheel Tires, of which the following is a specification.

This invention relates to an improved tire for velocipedes or other vehicles which is of as resilient a character as a pneumatic tire and which is not rendered unfit for use by puncturing.

Figure 1:
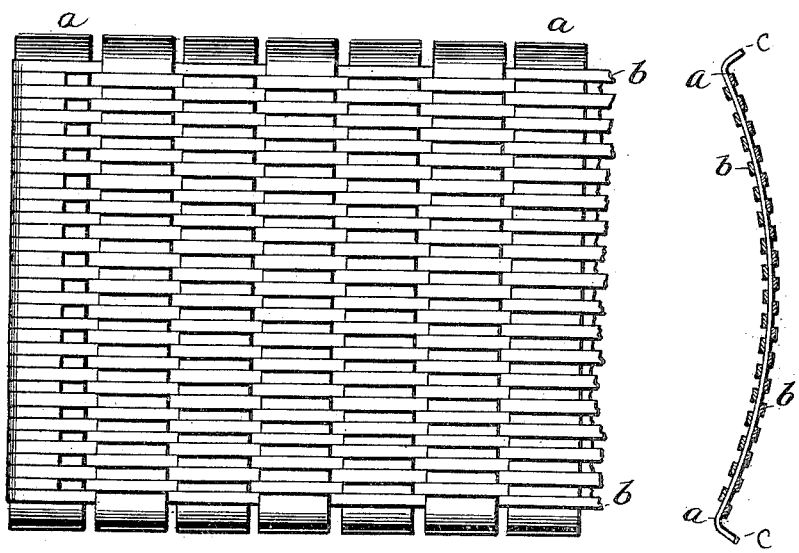
Figure 2:
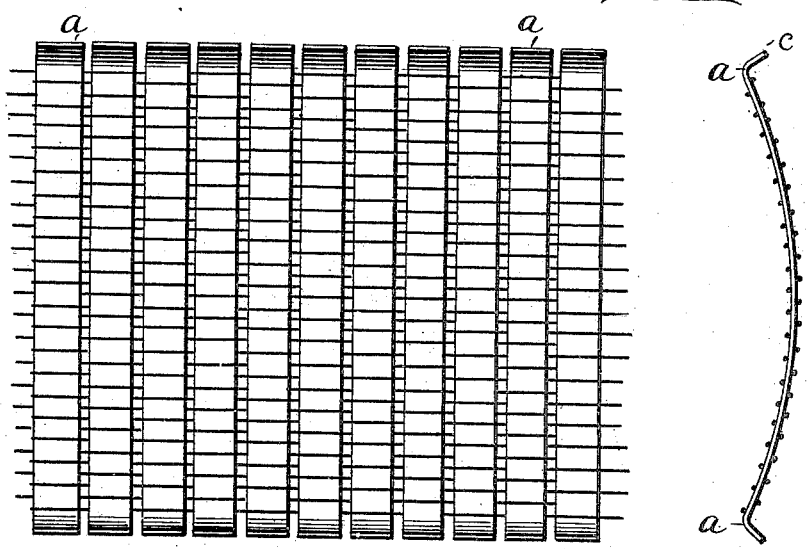

In the accompanying drawings, Figure 1 is a plan view and a cross-section of a tire embodying my invention, and Fig. 2 is a similar view illustrating a modification.

According to this invention I use a metallic fabric or gauze, the weft of which consists of relatively broad strips $a$, of spring-metal, while the warp is formed of relatively narrow sheet-metal strips or wires $b$, as shown. In this manner a fabric elastic in transverse direction is obtained which when fitted with its edges into the rim of the wheel serves as a perfect substitute for a pneumatic tire. In order that this metallic tissue or gauze may be readily retained in the rim without further auxiliary means, its weft-springs have both their ends $c$ bent into hook form, as clearly shown in the drawings, so as to embrace the groove of the wheel-rim and to rest upon the outer surface of the said groove, as will be understood. The weft-springs thus fixed are, without the use of any other auxiliary means, prevented from becoming vertically displaced, or instead of the ends of the weft-blades being hook-shaped they may be bent or otherwise formed, so as to solely rest upon the top of the outer surface of the grooves, while the inner space of the groove is filled up by the thickened edges of the outer rubber covering of the metal gauze or fabric, so that the said cover is retained in the rim without any auxiliary fastening.

This improved tire is applicable to any kind of rim provided with lateral grooves.

Instead of using leaf-springs, springs of other shape may be employed.

I claim—

A woven fabric adapted for use in connection with bicycle or other tires, composed of narrow longitudinal strips of metal and relatively broad strips of spring metal extending transversely across the fabric, the said transverse strips being separated and out of contact with each other and having their ends bent upwardly to engage with the flanges or channels of a wheel-rim, substantially as described.

In testimony whereof I have signed my name to this specification in the presence of two subscribing witnesses.

JOHANN LUDWIG.

Witnesses:
  FRANZ HASSLACHER,
  MICHAEL VOLK.